Patented Aug. 9, 1949

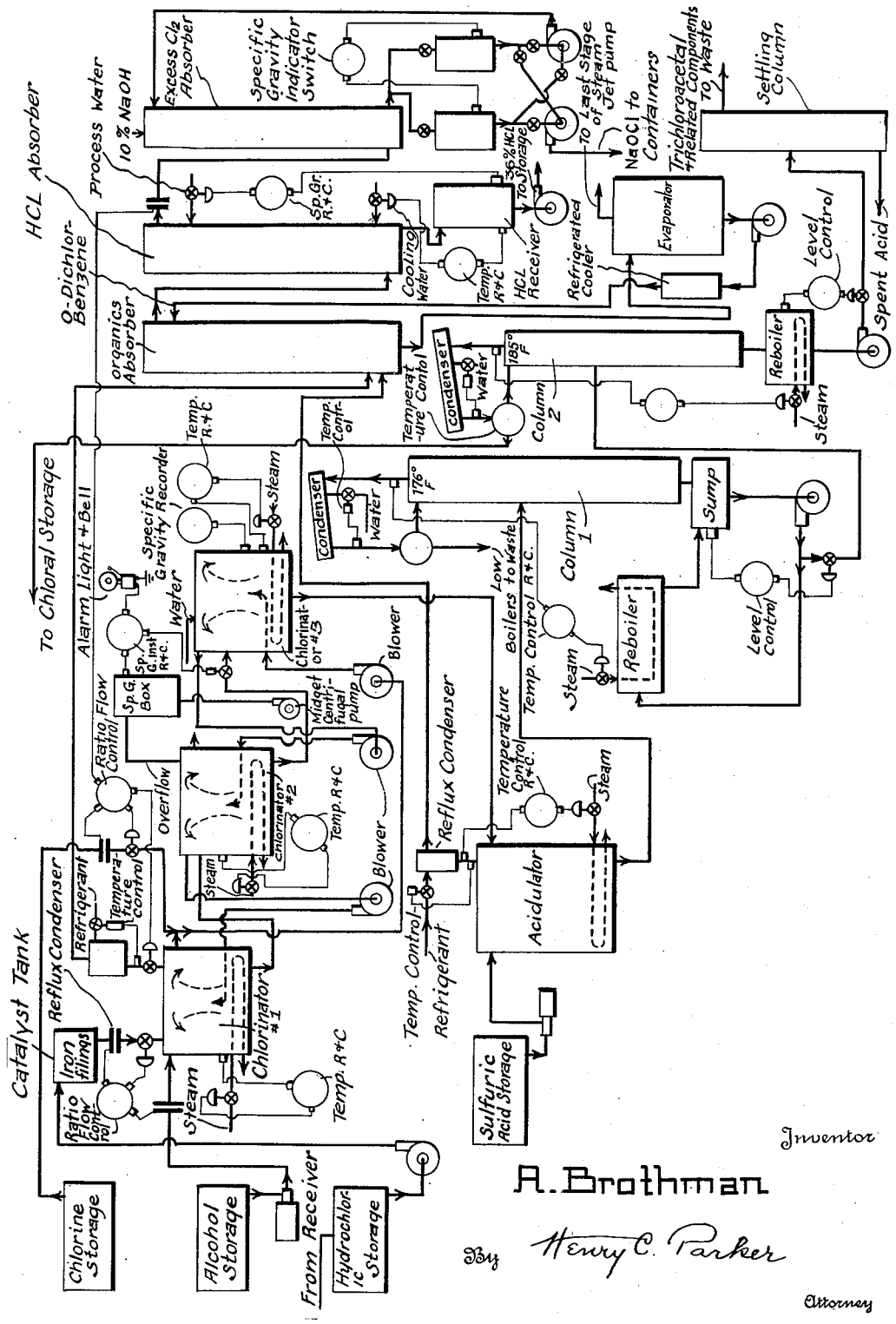

2,478,741

UNITED STATES PATENT OFFICE 2,478,741

MANUFACTURE OF CHLORAL

Abraham Brothman, New York, N. Y., assignor to Graver Tank & Mfg. Co., Inc., a corporation of Delaware Application August 21, 1945, Serial No. 611,865

20 Claims. (Cl. 260—601)

This invention relates to manufacture of chloral; and it consists in a continuous process of making chloral from ethyl alcohol and chlorine wherein the alcohol and chlorine are continuously fed to a series of interconnected reacting vessels, the alcohol and a chlorination catalyst being fed to the first vessel in said series, which vessel is maintained at a temperature of about 122° to 200° F., and being passed through the reaction vessels seriatim, chlorine in excess is fed to the last vessel in said series and being passed through said series in counter-current to the flow of said alcohol, the alcohol and chlorine being employed in the molecular proportions of about 1:4 to 1:8, the flow of chlorine being advantageously controlled by the amount of chlorine given off in the reaction vessels and the flow of alcohol and catalyst through the first two reaction vessels being controlled in such fashion that the liquid reaction mixture passing into the last vessel in said series has a specific gravity of about 1.37 to 1.43; water is passed into the final reaction vessel in the proportions of about 1 to 1.5 mols per mol of alcohol, the reaction mass coming from the last reaction vessel being maintained at a gravity about 0.1 higher than that of the mass flowing into said vessel and being sent to an acidulator wherein it is mixed, at a temperature ranging from about room temperature to 195° F., with from about 80 to 150 per cent by weight of concentrated sulfuric acid to liberate chloral from the chloral alcoholate and chloral hydrate formed in the said series of reaction vessels, the acidulated product is then fractionated to remove low boiling impurities and finally the chloral is distilled off and recovered; all as more fully hereinafter set forth and as claimed.

While processes of manufacturing chloral by the chlorination of ethyl alcohol have been known for many years it has been found impossible to obtain high yields by any of the methods which have hitherto been employed. Several theories have been advanced to explain the results produced in these processes. Since in these prior processes it had not been possible to obtain even 1 mol of chloral from the reaction products for each two mols of alcohol introduced into the chlorinator, it has generally been supposed that the various reactions which take place in the chlorinator can be summarized by the following equation:

I $\quad 4Cl_2 + 2C_2H_5OH \rightarrow Cl_3CCH(OH)OC_2H_5 + 5HCl$

This equation assumes that chloral alcoholate (hemiacetal) is formed in the chlorinators. Upon treatment with sulfuric acid the alcoholate was presumed to be broken down to give 1 mol of chloral. But the yields obtained in these prior processes were considerably below the theoretical even when based on the above equation of reaction.

I have discovered that, by a modification of the prior process, yields can be obtained which when calculated in the same manner would amount to over 100 per cent of theory. This proves, of course, that the above equation does not correctly represent the reactions which take place, at least in my modified process. In this new process the alcohol is chlorinated in an initial reaction zone or zones until a gravity of about 1.4 is obtained and these reaction products are then passed into another chlorinating zone in which water is added. It is my theory that the water added in this final chlorinating zone tends to convert the chloral alcoholate (hemi-acetal) into chloral hydrate thus liberating alcohol which again is free to take part in the chlorinating reaction. The equations of the various reactions which take place in my process can then be written as follows:

II $\quad C_2H_5OH + Cl_2 \rightarrow HCl + C_2H_5OCl$

III $\quad CH_3CH_2OCl + C_2H_5OH \rightarrow$
$\quad\quad\quad CH_3CH(OH)OC_2H_5 + HCl$ IV $\quad 3Cl_2 + CH_3CH(OH)OC_2H_5 \rightarrow$
$\quad\quad\quad 3HCl + Cl_3OCH(OH)OC_2H_5$ V $\quad Cl_3CCH(OH)OC_2H_5 + HOH \rightarrow$
$\quad\quad\quad Cl_3CCH(OH)OH + C_2H_5OH$ If these equations are added we obtain:

VI $\quad C_2H_5OH + 4Cl_2 + HOH \rightarrow 5HCl + Cl_3CCH(OH)OH$ as an over-all equation of the reaction taking place in the chlorinators.

It will be noted that the above equation requires only one mole of alcohol to form 1 mole of chloral hydrate which of course, will produce 1 mole of chloral when treated with acid. I have obtained yields of up to 60 per cent of theory when based on this equation, which would represent yields of 120 per cent if based on Equation I.

While I have no proof that the reaction of Equation V actually takes place, it is believed that this is at least reasonable in view of the formation of ethyl chloride as a side reaction product during the chlorination of alcohol. It is my theory that this ethyl chloride is formed in accordance with the equation:

VII $$Cl_3CCH(OH)OC_2H_5 + HCl \xrightarrow{H_2O} C_2H_5Cl + Cl_3CCH(OH)OH$$

and, if this is the correct explanation of the formation of ethyl chloride, it seems reasonable to suppose that chloral alcoholate would react to at least some extent with water, in accordance with Equation V to form chloral hydrate. But whatever theory is used to explain my results the facts remain as stated. Equation I obviously does not hold.

The addition of water at the start of the usual chlorination reduces the yield, while it increases the yield if added towards the end of the reaction, in accordance with my invention. My theory to account for these phenomena is the following: The presence of water in substantial quantities at the beginning of the reaction provides a solvent for the HCl which results from the chlorination reaction. The larger the amount of water at any given temperature and pressure, the larger the amount of HCl is absorbed and hence the greater is the extent to which reaction VII occurs. If the water is added towards the end of the reaction and hence at a time when substantially the bulk of the HCl has already been generated and has left the system, Reaction V is favored over Reaction VII. That is to say, at all times during the chlorination, Reactions V and VII are competitive with one another, V being favored when the concentration of HCl in solution is at a minimum.

I have found that a highly efficient continuous process can be conducted in accordance with my invention with the use of two or more separate reaction vessels in which chloral hydrate is produced. 95 per cent alcohol, usually mixed with an iron chloride catalyst, is passed in one direction seriatim through these vessels while the chlorine is introduced at the end of the series and passed counter-currently in the opposite direction. This makes it possible to add water to the final vessel of the series while the other vessels are maintained relatively free from water and at the optimum temperature to produce maximum yields of chloral hydrate. Part of the gases evolved in the first reaction vessel can be recycled, if desired, to be mixed with the chlorine passing into the last vessel of the series. The reaction products can then be passed from the final reaction vessel into an acidulator, kept at the temperature best suited for the decomposition of the chloral hydrate, and finally through continuous fractionating columns for recovery of the chloral and removal of impurities. I have found that gravity controls can be employed advantageously to control the flow of the reaction products out of the next-to-last reaction vessel and out of the final vessel of the series, while the volume of the unreacted chlorine evolved in the process can be employed to control the input of chlorine passed into the final reaction vessel.

A part or all of the gases evolved from the first reaction vessel, which include HCl and unreacted chlorine, can be recycled to the last reaction vessel, if desired. These gases contain some alcohol and other organics and for this reason it is usually advantageous to treat them for recovery of the organics in a contact tower by scrubbing them with an inert solvent. The HCl in the scrubbed gases can then be recovered by scrubbing with water to produce an acid of approximately 36 per cent strength and the latter can then be used for making the iron chloride catalyst. The gases passing from the HCl absorber, which contain unabsorbed HCl and the unreacted chlorine, can be used as a means of controlling the volume of chlorine and recycled gases passing to the bank of chlorinators. In order to recover chlorine from these gases they can be scrubbed with caustic soda to form sodium hypochlorite, or the chlorine can be otherwise recovered.

It is usually desirable to employ two fractionating towers to recover the chloral from the acidulated reaction products passing from the acidulator. In the first of these towers the low boiling reaction products can be removed overhead, these products including ethylidene dichloride, ethylene dichloride, ethyl chloride and ethyl ether, the latter being formed in the acidulator by reaction of the sulfuric acid and the alcohol. The bottoms from this first fractionating tower contain chloral mixed with trichloracetal and high-boiling resinous material. These are sent to a second fractionating tower in which the chloral is finally distilled off and recovered.

My invention can be explained in greater detail by reference to the accompanying drawing which represents a flow sheet of a practical operating embodiment of my process, which is capable of producing yields of about 60 per cent of the theoretical, based upon the alcohol consumed. The operation of the process is believed to be rather evident from the descriptive legends on the flow sheet.

Tanks holding the raw materials used in the process are shown at the left side of the drawing. Three chlorinators are illustrated, designated as Nos. 1 to 3. Each of these chlorinators is provided with agitating means in the form of gas-lift and draft-tube assemblies. It will be noted that alcohol is fed into the top of chlorinator No. 1 and that hydrochloric acid is passed to a catalyst chamber filled with iron filings or the like to generate the iron chloride catalyst which is also passed into the top of the first chlorinator. A ratio flow controller is installed in the alcohol and catalyst feed lines and operates to control these feeds in the ratio of about 1.04 parts of catalyst to 100 parts of alcohol. Indirect heating by steam is employed to control the temperature of the first chlorinator at about 122° to 195° F. (preferably 150° F.). Chlorine from the top of chlorinator No. 2 passes into the bottom of chlorinator No. 1 and the unreacted chlorine, together with HCl and other volatiles formed in the process, pass out at the top of No. 1 through the reflux condenser shown, which is operated at a temperature of about 32° to 70° F. (preferably 50° F.), these effluent gases being then passed into the bottom of the organics absorber.

The liquid reaction products formed in chlorinator No. 1, together with unreacted alcohol and catalyst, are passed out at the bottom of chlorinator No. 1 into the top of No. 2 while chlorine from the top of No. 3 is passed into the bottom of No. 2. No. 2 is maintained at a temperature of about 122° to 195° F. (preferably 150° F.) by indirect steam heating. The liquid products from No. 2 are drawn off through a specific gravity controlled valve serving to maintain the gravity in the bottom of No. 2 within the range of about 1.37 to 1.43, but preferably at about 1.4. These liquid products are passed to the top of chlorinator No. 3 and at this point water is added, to decompose the chloral alcoholate, in the amount of about 1 to 1.5 mols per mol of alcohol introduced into the process or roughly 5 per cent by volume based on the volume of the reacting mass. Chlorine from the chlorine storage tank is passed into the bottom of this chlorinator at a rate controlled in such fashion that the alcohol and chlorine are introduced into the vessels in the molecular proportions of about 1:4 to 1:8 or preferably about 1 to 5. The flow of the chlorine is controlled in accordance with the pressure of the chlorine issuing from the top of the HCl absorber, by the control system indicated. Approximately 5 mols of chlorine are advantageously supplied per mol of alcohol fed to the apparatus but the chlorine may be employed in proportions ranging from about 4 to 8 mols per mol of alcohol. Hydrogen chloride is produced in the reaction at a rate of about 5 mols per mol of chloral formed.

Chlorinator No. 3 is maintained at a temperature of about 122° to 195° F. (preferably 150° F.) by indirect heating with steam. A gravity control operates on the liquid discharge line from this chlorinator which serves to maintain the gravity at the bottom of the chlorinator at about 1.5 to 1.58, but preferably at about 1.55. This particular control can be omitted if desired.

The liquid reaction products from chlorinator No. 3 are passed into the top of the acidulator where they meet a stream of 96 per cent sulfuric acid drawn from the sulfuric acid storage tank. This acid accomplishes the conversion of chloral hydrate and alcoholate to chloral and is used in a quantity amounting to about 80 to 150 per cent or preferably 100 per cent by weight of the reaction products. The temperature of the acidulator is maintained at about 175° to 195° F. by indirect steam heating. The vapors evolved in the acidulator are passed through a reflux condenser which returns the condensate at a temperature of about 50° F. and are introduced into the bottom of the organics absorber. It should be noted that this reflux condenser, as well as that at the top of chlorinator No. 1, should be equipped with rotating scrapers to clear the surfaces from chloral hydrate crystals which have a tendency to deposit in these condensers.

The acidified reaction products from the acidulator are led to fractionating column No. 1. This column is equipped with a steam heated reboiler and sump through which the bottoms are circulated. The temperature at the top of the column is maintained at about 165° to 185° F. by means of reflux. The optimum temperature at the top of the column is about 176° F. A high reflux ratio is employed and, as a result, a maximum total mol fraction of only about 0.006 of low boilers is left in the bottoms. The low boilers driven off in this column can be sent to waste or to a recovery unit or they can be mixed with a fuel gas stream, burnt and absorbed in a tail gas scrubber of special design. The bottoms, containing the chloral and high boilers, are sent to column No. 2. This column is also equipped with a steam heated reboiler. The temperature at the top of the column is maintained at about 185° to 212° F. or preferably about 207° F. by means of reflux which enables the chloral to be distilled off, condensed and sent to storage. A relatively low reflux ratio is employed in this tower. There is virtually a quantitative separation of the chloral from the heavier impurities. A temperature control on the vapor line leading from the column controls the steam input to the reboiler at the base of the column.

The residuum from column No. 2 is drawn from the reboiler through a level controlled valve and sent to the settling column where it separates into a lower acid layer and an upper layer rich in trichloracetal. These layers can be drawn off and separately treated with recovery of acid and trichloracetal if desired. The level controls operating on the reboilers of columns Nos. 1 and 2 are employed to prevent the exhaustion of the bottoms, which would adversely affect the material-heat balance of the columns.

The organics absorber operates on the gases from chlorinator No. 1 and from the acidulator. This tower is well packed and the gases passing upwardly therein are met with a downwardly flowing stream of o-dichlorbenzene or other solvent which keeps the absorber at a temperature of 80° F. or below. The spent solvent drawn off at the bottom of the absorber is sent to an evaporator in which the absorbed organics are driven off, the evaporator operating advantageously under a vacuum produced by a steam jet pump. The purified solvent is sent through a cooler and returned to the absorber.

The gases passing off at the top of the organics absorber consist of HCl and excess chlorine. These gases are passed into the HCl absorber operating at a maximum temperature of 80° F., the quantity of water added at the top being controlled by a specific gravity controller to produce a 36 per cent HCl solution. A part of this hydrochloric acid can be recycled to produce the iron chloride catalyst, if desired.

The effluent gases from the HCl absorber, consisting principally of chlorine, are passed into the bottom of the excess chlorine absorber. This packed tower is fed at the top with a caustic soda solution which is recycled through one of the catch and recycle traps as indicated on the flow chart until a gravity corresponding to a hypochlorite solution of about 5 per cent by weight is produced, at which point the second trap is placed in circuit and the NaOCl collected in the first trap is sent to storage. This procedure is then repeated with the second trap. The temperature in this tower may range from about room temperature to about 120° F. Make-up caustic solution is passed into the top of the tower as the hypochlorite is drawn off. This make-up solution has a concentration of about 10 per cent NaOH.

In a specific embodiment of my process, conducted in a plant having a capacity of about 90,600 pounds of chloral per month, three chlorinators were used, the first two of which had a working capacity of 1400 gallons while the last had a working capacity of 2140 gallons. All were supplied with agitation. The acidulator employed had a capacity of 800 gallons. The alcohol was fed at a rate of 0.196 gallon per minute and the chlorine at a rate of 3.21 pounds per minute. Chlorinated reaction products were fed to the acidulator at a rate of 0.206 gallon per minute. These were acidulated with sulfuric acid fed at a rate of 0.126 gallon per minute. And chloral was recovered by fractionation at the rate of 2.5 pounds per minute.

While I have described what I consider to be the best embodiments of my process it is evident that various modifications can be made in the specific operating details which have been described without departing from the purview of this invention. Thus, while I have described the use of ortho-dichlorobenzene as an inert solvent in the organic absorber, it is evident that other organic solvents can be employed, which are inert and which exert low vapor pressures at temperatures below about 80° F. Examples of these are the chlorphenols and methyl and ethyl esters of saturated higher fatty acids. The temperatures of the different units, the ratios of reactants and the specific gravities which have been mentioned may all be varied to some extent from those disclosed without seriously affecting the operation of the process as a whole. It is necessary to employ at least two chlorinators in my process in order that the water can be introduced at an intermediate point. Three chlorinators represent the optimum number. More than three chlorinators can be employed in series with at least some increase in efficiency, albeit with an increased cost in equipment. While I have described the use of ferrous chloride as a chorination catalyst, any other chlorination catalyst can be employed, examples being aluminum chloride, ferric chloride, zinc chloride, boron trichloride etc. It is also possible to operate the process without a catalyst but with a slightly lower yield. It is possible to employ other non-volatile acids in place of the sulfuric acid used in the acidulator. Phosphoric acid is an example of such an acid. Any caustic alkali can be employed in the excess chlorine absorber. And the amount of chlorine passed through the chlorinators can be widely varied, a large excess being employed, if desired. Other modifications of my process which fall within the scope of the following claims will be immediately evident to those skilled in this art.

What I claim is:

1. A continuous process of producing chloral which comprises establishing and maintaining bodies of liquid in a series of reaction vessels by passing alcohol and a chlorination catalyst continuously into one end of said series operating at temperatures within the range of about 122 to 200° F., passing an excess of chlorine through said bodies of liquid in said reaction vessels in counter-current to the flow of the alcohol and catalyst, adding water to one of the last reaction vessels in said series at a point where the specific gravity of the liquid is within the range of about 1.37 to 1.43, acidulating the liquid reaction products passing from the last reaction vessel to decompose the resulting chloral alcoholate and hydrate, thereby forming chloral, and recovering the chloral.

2. The process of claim 1 wherein the chloral is recovered from the acidulated reaction products by first distilling off low boiling impurities and then distilling off and recovering the chloral.

3. The process of claim 1 wherein the chlorination catalyst is ferric chloride.

4. The process of claim 1 wherein the chlorination catalyst is zinc chloride.

5. The process of claim 1 wherein the flow of the liquid reaction products from the next to last reaction vessel of said series is controlled to produce a specific gravity of about 1.37 to 1.43, and the water is added to said last reaction vessel.

6. The process of claim 1 wherein the flow of the liquid reaction products from the next to last reaction vessel is controlled to produce a specific gravity of about 1.37 to 1.43 and the flow from the final reaction vessel is controlled to produce a gravity of about 1.5 to 1.58, said water being added to said final reaction vessels.

7. The process of claim 1 wherein the gaseous products passing from the first reaction vessel are contacted with an inert organic solvent to absorb organic impurities and then with water to recover HCl.

8. The process of claim 1 wherein the gaseous products passing from the first reaction vessel are contacted with an inert organic solvent to remove organic impurities, then with water to absorb HCl and finally with a caustic alkali solution to produce a hypochlorite from the chlorine contained therein.

9. The process of claim 1 wherein the quantity of chlorine passed into the last reaction vessel is controlled in accordance with the quantity of chlorine contained in the effluent gases from the first reaction vessel.

10. The process of claim 1 wherein the quantity of water added amounts to about 1 to 1.5 mols per mol of alcohol introduced in the process.

11. The process of claim 1 wherein the alcohol and the chlorine are fed to the reaction vessels in the molecular proportions of about 1:4 to 1:8.

12. The process of claim 1 wherein the gaseous products passing from the first reaction vessel are contacted with ortho-dichlorbenzene to remove organic impurities prior to recovery of the HCl and chlorine in said products.

13. The process of claim 1 wherein the reaction products are acidulated by adding from about 80 to 150 per cent of concentrated sulfuric acid.

14. A continuous process of making chloral which comprises continuously feeding the first of a series of interconnected reaction vessels, containing bodies of liquid reaction products maintained at a temperature of from about 122° to 195° F., with alcohol and a chlorination catalyst, introducing chlorine into the last reaction vessel of said series and passing it through the bodies of liquid in the reaction vessels in counter-current to the alcohol and catalyst, the alcohol and chlorine being employed in molecular proportions ranging from about 1:4 to 1:8, controlling the flow of alcohol in such fashion that the specific gravity of the liquid reaction products passing into the last reaction vessel of said series is within the range of about 1.37 to 1.43, adding from about 1 to 1.5 mols water per mol of alcohol employed in the process to the last reaction vessel of said series, adding from about 80 to 150 per cent of concentrated sulfuric acid to decompose the resulting chloral alcoholate and chloral hydrate, thereby forming chloral, and fractionating to recover the chloral.

15. The process of claim 14 wherein after acidulation the products are fractionated to remove a fraction lower boiling than chloral and another fraction higher boiling than chloral.

16. The process of claim 14 wherein the chlorination catalyst employed is iron chloride.

17. The process of claim 14 wherein the gases evolved from the first reaction vessel of said series are treated with an inert solvent to absorb organics, then with water to absorb HCl and finally with a caustic alkali solution to absorb chlorine.

18. The process of claim 14 wherein the amount of chlorine passed into last reaction vessel of said series is controlled by the amount of unreacted chlorine passing from the first vessel of said series.

19. A continuous process of making chloral which comprises continuously feeding the first of a series of interconnected reaction vessels containing bodies of liquid reaction products maintained at a temperature of from about 122° to 195° F. with substantially 95 per cent alcohol and iron chlorite serving as a chlorination catalyst, introducing chlorine into the last reaction vessel of said series and passing it through said bodies of liquid in the reaction vessels in counter-current to the flow of alcohol and iron chloride, the alcohol and chlorine being employed in molecular proportions ranging from about 1:4 to 1:8, controlling the flow of chlorine by the flow of unreacted chlorine evolved from the first reaction vessel, controlling the flow of alcohol to the process by the specific gravity of the reaction products passing into the last reaction vessel of said series in such fashion that the said specific gravity is maintained within the range of about 1.37 to 1.43, adding sufficient water to the last reaction vessel in said series to decompose the chloral alcoholate formed in the process, acidifying the reaction products to form chloral and recovering the chloral.

20. A continuous process of making chloral which comprises establishing and maintaining bodies of liquid in a series of three interconnected reaction vessels by continuously feeding a mixture of ethyl alcohol and a chlorination catalyst to the first vessel in said series, passing the liquid through the other two reaction vessels in series and withdrawing the liquid from the last vessel in said series, maintaining the temperature of the reaction vessels within the range of about 122° to 200° F., passing chlorine through the bodies of liquid in said reaction vessels in counter-current to the flow of liquid at a rate such that the molecular ratio between the alcohol and the chlorine is within the range of about 1:4 to 1:8, controlling the flow of liquid through said series in such fashion that the liquid flowing from the second into the last reaction vessel has a specific gravity within the range of about 1.37 to 1.43, acidifying the liquid passing from the last reaction vessel to form chloral and recovering the chloral.

ABRAHAM BROTHMAN.

REFERENCES CITED

The following references are of record in the file of this patent:

UNITED STATES PATENTS

| Number | Name | Date |
|---|---|---|
| 774,151 | Besson | Nov. 8, 1904 |
| 1,180,964 | Auger | Apr. 25, 1916 |
| 1,620,180 | Young et al. | Mar. 8, 1927 |
| 1,831,474 | Ayres | Nov. 10, 1931 |
| 1,854,428 | Segerfelt | Apr. 19, 1932 |
| 1,875,124 | Ormandy | Aug. 30, 1932 |
| 2,335,511 | Havermann et al. | Nov. 30, 1943 |
| 2,362,579 | Murray et al. | Nov. 14, 1944 |

FOREIGN PATENTS

| Number | Country | Date |
|---|---|---|
| 612,396 | France | Oct. 22, 1926 |

OTHER REFERENCES

Sabatier: "Catalysis in Organic Chemistry" (1922), page 106, paragraph 283.

Groggins: "Unit Processes in Organic Synthesis," 1935, pages 192, 193, 194, 206 and 207.

Callaham: "Chemical and Metallurgical Engineering," vol. 51, No. 10, October, 1944; pages 109–114.